United States Patent [19]

Schoen

[11] Patent Number: 4,580,603
[45] Date of Patent: Apr. 8, 1986

[54] SHUTOFF VALVE WITH A FLAP MEMBER

[75] Inventor: Otmar Schoen, Scheidterberg, Fed. Rep. of Germany

[73] Assignee: Unima Maschinenbau GmbH, Saar, Fed. Rep. of Germany

[21] Appl. No.: 694,766

[22] Filed: Jan. 25, 1985

[30] Foreign Application Priority Data

Jan. 27, 1984 [DE] Fed. Rep. of Germany ....... 3402782

[51] Int. Cl.$^4$ .................. F16K 11/14; F16K 11/12
[52] U.S. Cl. .................. 137/630.15; 137/625.46; 137/375; 137/599.2
[58] Field of Search .................. 137/629, 630, 630.11, 137/625.46, 630.12, 630.13, 630.14, 630.15, 630.16, 630.17, 630.19, 630.20, 630.21, 599.2, 625.47, 625.21, 625.31, 632.2, 632.21; 251/305

[56] References Cited

U.S. PATENT DOCUMENTS

| | | | |
|---|---|---|---|
| 2,351,613 | 6/1944 | Hopkins | 137/625.46 |
| 2,796,082 | 6/1957 | Green et al. | 137/630.15 |
| 3,078,070 | 2/1963 | Cooper | 137/625.46 |
| 3,228,653 | 1/1966 | Trimmer | 137/625.46 X |

FOREIGN PATENT DOCUMENTS

| | | | |
|---|---|---|---|
| 568497 | 1/1959 | Canada | 137/625.46 |
| 1062074 | 7/1959 | Fed. Rep. of Germany | 137/625.46 |
| 55-90764 | 7/1980 | Japan | 137/594.2 |

Primary Examiner—Martin P. Schwadron
Assistant Examiner—John S. Starsiak, Jr.
Attorney, Agent, or Firm—Roylance, Abrams, Berdo & Goodman

[57] ABSTRACT

A shutoff valve has a movable flap member rotatably mounted in a valve housing. The valve housing has concentric, spherically-shaped sealing surface zones which cooperate with an edge of the flap member. The housing also has two coaxial couplings and one perpendicular coupling. By rotation of the flap member, flow can be directed from the perpendicular coupling to either of the two coaxial couplings. The three couplings have axes which meet at a common point. The rotational axis of the flap member passes through that common point. The two concentric spherical sealing surface zones are separated by a 90° rotation of the flap member.

4 Claims, 14 Drawing Figures

SHUTOFF VALVE WITH A FLAP MEMBER

FIELD OF THE INVENTION

The present invention relates to a shutoff valve comprising a housing with three couplings, a rotatable flap member mounted in the housing and a sealing surface inside the housing to engage and form seals with edges of the flap member to control flow between the three couplings.

BACKGROUND OF THE INVENTION

A conventional shutoff valve has a single sealing surface configured as a spherical zone, and has only two coaxial attachments or couplings. Flow can only be straight through the valve. A typical example of this conventional valve is disclosed in Lueger Lexikon der Technik, 4th printing, Vol. 1, 1960, page 242.

Such conventional valves have limited utility since flow can be directed in only one direction.

SUMMARY OF THE INVENTION

An object of the present invention is to provide a shutoff valve in which flow can be directed in a plurality of directions.

Another object of the present invention is to provide a shutoff valve having three couplings and which permits the pressure to be balanced therebetween by mere rotation of valve parts.

The foregoing objects are obtained by a valve having a housing, a flap member rotatably mounted in the housing and a sealing surface inside the housing for engaging and forming seals with the edges of the flap member. The housing has first and second couplings which are coaxial and a third coupling perpendicular to the first and second couplings. The three couplings have axes intersecting at a common point. The flap member is rotatable about an axis passing through the common point and perpendicular to the axes of the couplings. The sealing surface is defined by portions of a sphere with first and second spherically-shaped surface zones separated by a 90° rotation of the flap member.

By forming the valve in this manner, mere rotation of the flap member causes one of its edges to engage either of the first and second spherically-shaped surface zones. Engagement of a flap member edge with one of the surface zones directs the flow in either one of the two directions.

Preferably, a valve member is mounted in the flap member for rotation about the rotation axis independently of the flap member, and has a flowthrough passageway therethrough. By rotating the valve member independently of the flap member, suitable connections can be made between the couplings to facilitate pressure balance operations with mere pivoting movements with slight force.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF PREFERRED EMBODIMENT

Figure 1:
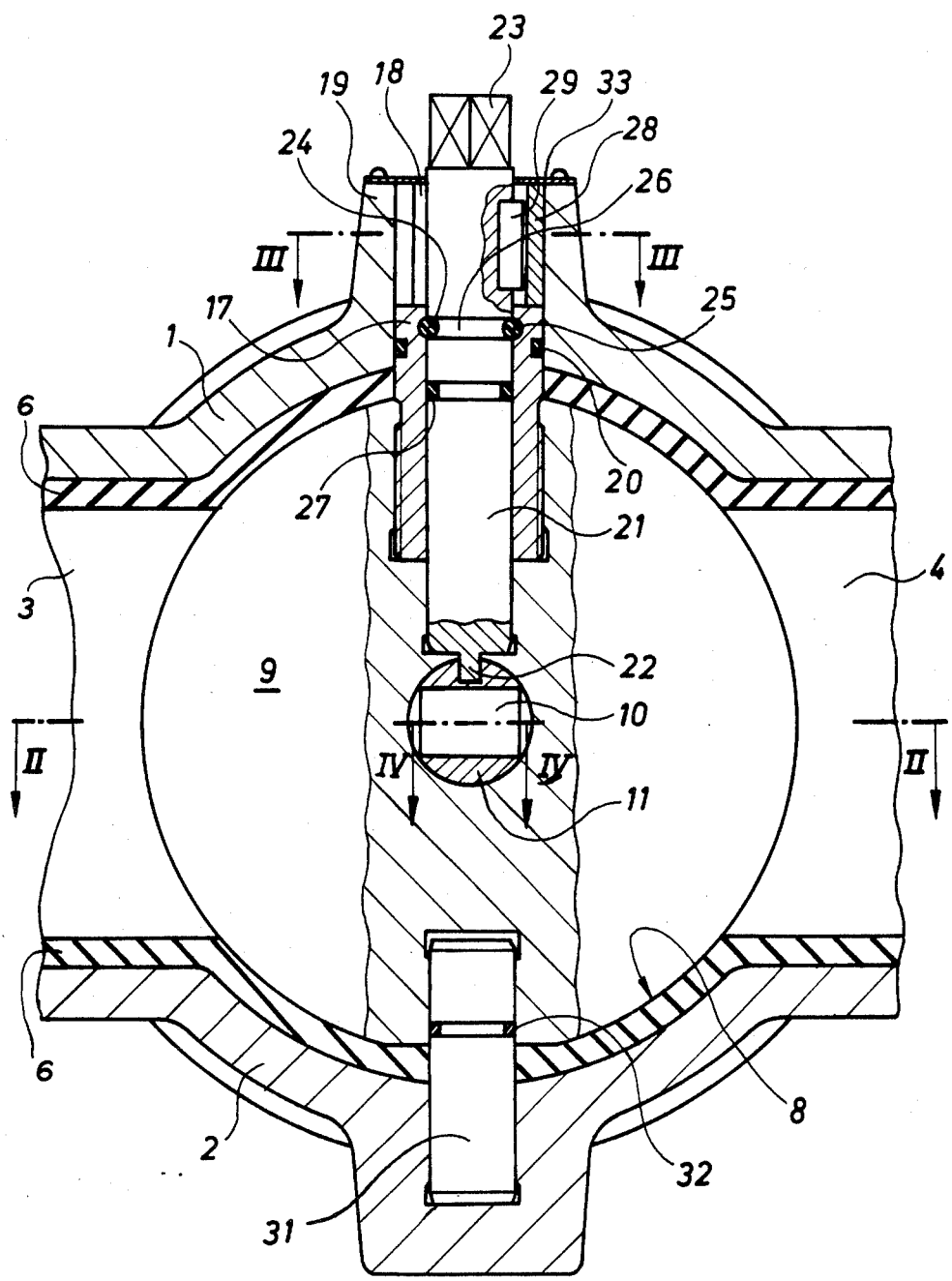
FIG. 1 is a partial, side elevational view in section of a valve according to the present invention taken long lines I—I of FIG. 2.
Figure 2:
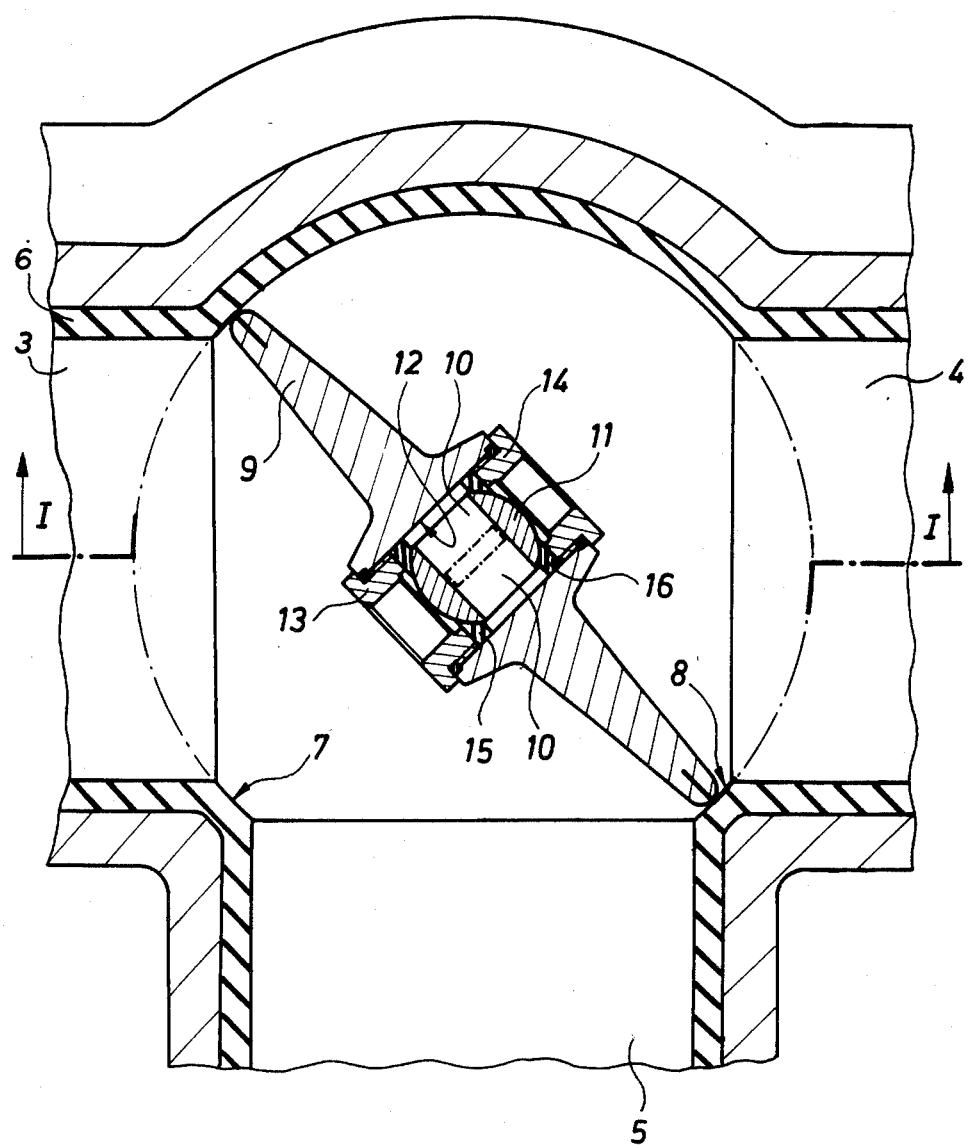
FIG. 2 is a top plan view in section of the valve of FIG. 1 taken along lines II—II of FIG. 1.

Referring initially to FIGS. 1 and 2, the shutoff valve of the present invention includes a housing formed of two housing parts 1 and 2. Housing parts 1 and 2 are held together by screws. The housing includes three attachments or couplings 3, 4 and 5 having flanges for coupling conduits thereto. Couplings 3 and 4 are coaxial, while coupling 5 extends along an axis perpendicular to the axes of couplings 3 and 4. The internal diameters of couplings 3, 4 and 5 are essentially identical.

The housing portion between the couplings is somewhat larger and has an elastic lining 6 on its inner surface. Directly between conduits 3 and 5 the housing has a sealing surface zone 7. Between couplings 4 and 5, the housing has a sealing surface zone 8. The surface zones 7 and 8 form portions of a spherical surface and are concentric in that they are defined by equal radii of curvature emanating from a common point. All of the sealing surfaces of the housing are portions of a common sphere.

The main moveable part of the valve comprises a flap member 9 which is rotatably mounted in the housing. In the center of flap member 9, a switchable valve member 11 is mounted. Valve member 11 has a straight flowthrough bore 10 and has an outer configuration generally in the shape of a ball or sphere. Valve member 11 is retained in a straight flowthrough bore 12 in flap member 9 by lock screws 13 and 14. Gaskets 15 and 16 are provided between lock screws 13 and 14.

A hollow journal 17 is threadedly engaged with flap member 9 so as to rotate simultaneously therewith. Journal 17 extends along a longitudinal axis perpendicular to the axes of couplings 3, 4 and 5. Housing part 1 has an upright 19 which receives rotatably journal 17. At the top end of journal 17 a partially cylindrically shaped member or annular first sector 18 is fixed on the interior surface of the journal. Sector 18 extends over an angle of about 90°. The clearance between journal 17 and upright 19 of housing part 1 is sealed by a gasket 20.

A pivot pin 21 is rotatably mounted within journal 17 and extends along the axis defining the radius of curvature of sector 18. Pivot pin 21 is non-rotatably connected by a projection 22 with valve member 11. A square end 23 is provided on the outside of pivot pin 21, opposite projection 22, for non-rotatably engaging an operating lever 30 (see FIGS. 5, 7, 9, 11 and 13). The pivot pin is retained axially within journal 17 by lock pins 24 and 25 oriented perpendicular to the longitudinal axis of pin 21. The lock rings are engaged in an annular groove 26 in pivot pin 21. The clearance between pivot pin 21 and journal 17 is sealed by a gasket 27.

A second sector 28 is mounted in the same annular or cylindrical space between pivot pin 21 and journal 17 as first sector 18. In this manner, sectors 18 and 28 are adjacent and are oriented in the same cylinder. Second sector 28 is connected by a spring operated connection 29 non-rotatably with pivot pin 21 such that pivot pin 21 and second sector 28 rotate simultaneously. Like sector 18, sector 28 forms a portion of a cylinder and has an arcuate length of approximately 90° with both sectors having identical radius of curvatures.

On top of upright 19, a cover 33 extends over sectors 18 and 28. This cover holds sector 28 in its desired axial position, adjacent sector 18.

Flap member 9 is rotatably mounted, at its side opposite journal 17, on a journal pin 31 mounted in housing part 2. The clearance between journal pin 31 projecting into flap member 9 and flap member 9 is sealed by a gasket 32.

Figure 3:
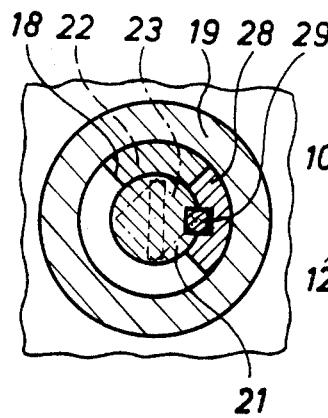
FIG. 3 is a top plan view in section taken along lines III—III of FIG. 1.
Figure 4:
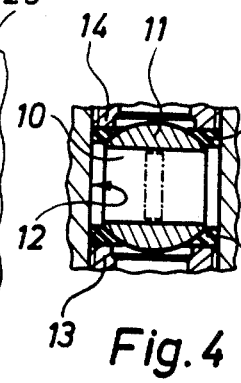
FIG. 4 is a top plan view in section taken along lines IV—IV of FIG. 1.

With the parts of the shut off valve oriented in the positions illustrated in FIG. 2, coupling 5 is in direct fluid communication with coupling 3. However, flap member 9 and the other valve parts are illustrated in FIGS. 1, 3 and 4 after being turned at an angle of 45° counterclockwise relative to the orientation illustrated in FIG. 2.

In the position illustrated in FIG. 2, flap member 9 separates coupling 4 from couplings 3 and 5, with one edge of flap member 9 sealingly engaging surface zone 8. If flap member 9 is rotated 90° clockwise, then its edge sealingly engages surface zone 7 placing couplings 4 and 5 in direct fluid communication with each other and separating coupling 3 from couplings 4 and 5.

FIGS. 5-14 show the various positions of flap member 9 and valve member 11 which are obtained merely by pivoting member 30. The sectors 18 and 28 are shown diagrammatically in their relative positions.

Figures 5, 6:
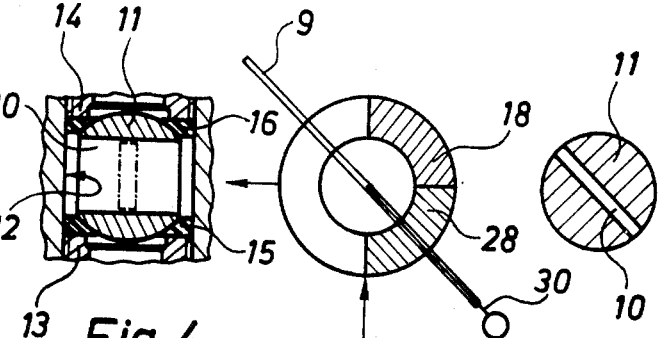
FIGS. 5–14 are simplified and diagrammatic views in section corresponding generally to the illustrations of the FIGS. 3 and 4 and illustrating various operational positions of the valve of FIG. 1.

FIGS. 5 and 6 are representative of similar relative positions of flap member 9 and valve member 11. FIGS. 2, 5 and 6 represent the flap member 9 and the parts non-rotatably connected therewith in identical positions. In such position, bore 10 is closed within flap member 9 as illustrated in FIG. 2.

Figure 7:
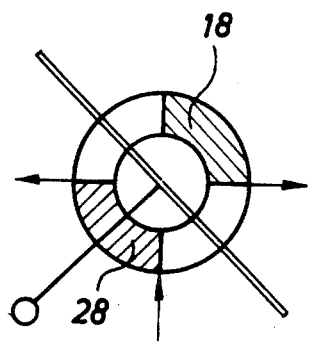
Figures 8, 9, 10:
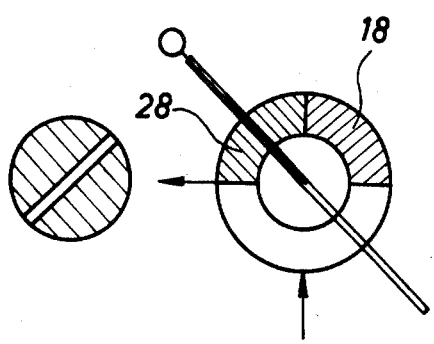
Figure 11:
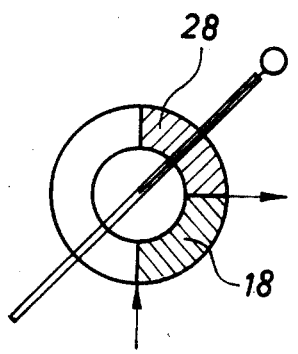

If operating member 30 is rotated 90° in a clockwise direction from the positions of FIGS. 2, 5 and 6, valve member 11 is also pivoted 90° in a clockwise direction as represented by FIGS. 7 and 8. During this pivoting motion, flap member 9 remains stationary by frictional forces. The pivoting of valve member 90° connects the three couplings 3, 4 and 5 together permitting a pressure balance to occur between these couplings.

Continued pivoting of operating member 30 in the clockwise direction for an additional 90° again brings the valve member into a position such that bore 10 is again closed within flap member 9. Coupling 4 remains separated from couplings 3 and 5 with the parts positioned as illustrated in FIGS. 9 and 10.

If operating member 30 is then again pivoted in a clockwise direction for another 90°, sector 28 engages and pushes sector 18 through a 90° arc. Such movement of sector 18 causes journal 17 and flap member 9 fixed thereto to also pivot through an angle of 90°. The parts assume the positions illustrated in FIGS. 11 and 12 in which bore 10 is closed within the flap member and sealing zone 7 is engaged with an edge of flap member 9 such that couplings 4 and 5 are in direct fluid communication and are separated from coupling 3.

Figures 12, 13, 14:
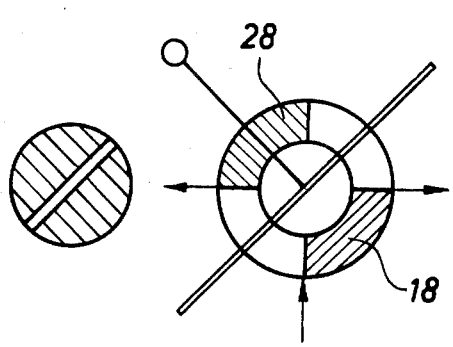

If the operating member is now pivoted in a counterclockwise direction through an angle of 90°, valve member 11 is rotated relative to flap member 9 opening bore 10 for pressure balance. This clockwise rotation of operating member 30 and valve member 11 is depicted in FIGS. 13 and 14 and produces a fluid connection between all three couplings. Since second sector 28 is disengaged from first sector 18, the valve member 11 and flap member 9 pivot independently, i.e., valve member 9 remains stationary, while valve member 11 pivots.

From the position illustrated in FIGS. 13 and 14, operating member 30 can be pivoted 180° in a counterclockwise direction such that second sector 28 will move freely for 90° and then engage and rotate first sector 18 counterclockwise for 90°. This 180° counterclockwise rotation of operating member 30 causes the shutoff valve to return to the position lilustrated in FIGS. 5 and 6.

By forming the shutoff valve with an independently operable valve member and operating it as described above, flow direction can be changed by selectively directing the flow through coupling 3 or coupling 4. Additionally, a pressure balance can be achieved between each of the three couplings 3, 4 and 5.

While a particular embodiment has been chosen to illustrate the invention, it will be understood by those skilled in the art that various changes and modifications can be made therein without departing from the scope of the invention as defined in the appended claims.

What is claimed is:

1. A valve, comprising:
 a housing having first, second and third couplings, said first and second couplings being coaxial, said third coupling being perpendicular to said first and second couplings, said couplings having axes intersecting at a common point;
 a flap member rotatably mounted in said housing about a rotation axis passing through said common point and perpendicular to said axes of said couplings, said flap member having opposite edges;
 a sealing surface inside said housing for engaging and forming seals with said edges of said flap member, said surface being defined by portions of a sphere with first and second spherically-shaped surface zones separated by a 90° rotation of said flap member;
 a valve member mounted in said flap member by a pivot pin for limited roration about said rotation axis independently of said flap member, said valve member having a flow through passageway;
 a journal rotatably mounted in one end of said housing and fixed to said flap member to rotate simultaneously therewith, said journal and said pivot pin being coaxial; and
 hinge connection means for coupling said pivot pin and said journal for opening said flow through passageway by moving said valve member when said flap member is stationary.

2. A valve according to claim 1 wherein said hinge connection means comprises first and second sectors, each of said sectors extending over an arc of about 90° in a common cylinder, said first sector being fixed to said journal, said second sector being fixed to said pivot pin.

3. A valve, comprising:
 a housing having first, second and third couplings, said first and second couplings being coaxial, said third coupling being perpendicular to said first and second couplings, said couplings having axes intersecting at a common point;

a flap member rotatably mounted in said housing about a rotation axis passing through said common point and perpendicular to said axes of said couplings, said flap member having opposite edges;

a sealing surface inside said housing for engaging and forming seals with said edges of said flap member;

a valve member mounted in said flap member by a pivot pin for limited rotation about said rotation axis independently of said flap member, said valve member having a flow through passageway;

a journal rotatably mounted in one end of said housing and fixed to said flap member to rotate simultaneously therewith, said journal and said pivot pin being coaxial; and hinge connection means for coupling said pivot pin and said journal for opening said flow through passageway by moving said valve member when said flap member is stationary.

4. A valve according to claim 3 wherein said hinge connection means comprises first and second sectors, each of said sectors extending over an arc of about 90° in a common cylinder, said first sector being fixed to said journal, said second sector being fixed to said pivot pin.

* * * * *